United States Patent
Swett

(10) Patent No.: US 7,210,136 B2
(45) Date of Patent: Apr. 24, 2007

(54) PARSER GENERATION BASED ON EXAMPLE DOCUMENT

(75) Inventor: Ian Douglas Swett, Pasadena, CA (US)

(73) Assignee: Avaya Inc., Basking Ridge, NJ (US)

( * ) Notice: Subject to any disclaimer, the term of this patent is extended or adjusted under 35 U.S.C. 154(b) by 522 days.

(21) Appl. No.: 10/365,747

(22) Filed: Feb. 14, 2003

(65) Prior Publication Data

US 2003/0221169 A1    Nov. 27, 2003

Related U.S. Application Data

(60) Provisional application No. 60/383,156, filed on May 24, 2002.

(51) Int. Cl.
   *G06F 9/44*    (2006.01)
(52) U.S. Cl. ............ 717/143; 717/114; 715/500; 715/513
(58) Field of Classification Search ............ None
   See application file for complete search history.

(56) References Cited

U.S. PATENT DOCUMENTS 6,941,511 B1 * 9/2005 Hind et al. ............ 715/523
2003/0182282 A1 * 9/2003 Ripley ............ 707/5
2004/0031024 A1 * 2/2004 Fairweather ............ 717/143
2004/0044659 A1 * 3/2004 Judd et al. ............ 707/3
2005/0060306 A1 * 3/2005 Hattori et al. ............ 707/3

OTHER PUBLICATIONS

Martin V. Lowis, "Towards a Standard Parser Generator", Conference Proceedings, The Tenth International Pyton Conference, Feb. 4-7, 2002, Online, [Retrieved on Feb. 28, 2006] from <http://python10.org/p10-papers/18/index.htm> Total 17 pages.*

* cited by examiner

*Primary Examiner*—Tuan Dam
*Assistant Examiner*—Andrew Y. Chou
(74) *Attorney, Agent, or Firm*—David Volejnicek

(57) ABSTRACT

The process generates a parser to extract records from a set of documents. The process operates on a sample document from the set. The sample document is an XML document or is converted to an XML document. Simple Xpaths of the XML document are identified. Complex extensions of the simple Xpath are clustered according to common substructures. The complex Xpath clusters are scored according to content in instances or differences in content among instances. Candidate parsers are created. Each candidate consists of a single record Xpath and one or more field value Xpaths that are descendents of the record Xpath. The candidate parsers are ranked using the Xpath scores.

8 Claims, 1 Drawing Sheet

US 7,210,136 B2

PARSER GENERATION BASED ON EXAMPLE DOCUMENT

CROSS REFERENCE TO RELATED APPLICATIONS

This application claims the benefit of U.S. patent application Ser. No. 60/383,156, entitled "PARSER GENERATION BASED ON EXAMPLE DOCUMENT" filed by Ian Swett on May 24, 2002, the contents of which are incorporated herein by reference.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISK APPENDIX

Not Applicable.

TECHNICAL FIELD

The present invention, in the field of software programming, is an algorithm that takes a document and generates a parsing scheme to parse similarly structured documents in the future.

BACKGROUND OF THE INVENTION

A parsing scheme takes a document and returns records. A record is a series of values. Each value corresponds to a field, which has a name and a type. An example of a record is {"blue", 19, "$0.50"}. The corresponding fields for that record may be a string field named color, an integer field named quantity, and a price field named price.

XML is a standard text markup language. An XML document has a hierarchical organization, so the document can be viewed as a "tree". For example, consider the following XML document:

```
<html>
    <table>
        <tr><td>Price</td><td>Quantity</td></tr>
        <tr><td>$5</td><td>10</td></tr>
        <tr><td>$10</td><td>5</td></tr>
        <tr><td>$12</td><td>7</td></tr>
    </table>
</html>
```

The document can be viewed as a heirarchical tree, as follows:

```
html
|- table
   |- tr
   |  |- td - Price
   |  |- td - Quantity
   |- tr
   |  |- td - $5
   |  |- td - 10
   |- tr
   |  |- td - $10
```

```
   |  |- td - 5
   |- tr
      |- td - $12
      |- td - 7
```

XML information and the XML spec can be found at http://www.w3c.org/XML/. XPath is a query language used to specify portions of the XML tree. The standard for XPath is available at http://www.w3.org/TR/xpath. Xpath is used to refer to specific nodes or sets of nodes from the XML document. Unless otherwise stated in this document, an Xpath refers to a set of nodes, rather than a specific node. This document uses the terms simple Xpath and complex Xpath, with the following definitions:

Simple Xpath—A simple Xpath is one which has only node names and '/' characters separating them, such as "/html/table/tr".

Complex Xpath—A complex Xpath has parametric information, such as "only get tables which contain a TR", expressed as "/html/table[tr]".

For example, in the sample XML document, the simple Xpath "/html/table/tr" refers to the tr nodes. In the sample XML document, the complex Xpath "/html/table/tr[1] refers to the first tr node.

A parser based on Xpath may employ the concepts of "row Xpath" and "column Xpath". A row Xpath indicates a method to parse record regions from an XML document. A column Xpath indicates a method to parse fields from each record region. For example, for the sample document, a parser with row Xpath "/html/table/tr" produces record regions:

```
<tr><td>Price</td><td>Quantity</td></tr>
<tr><td>$5</td><td>10</td></tr>
<tr><td>$10</td><td>5</td></tr>
<tr><td>$12</td><td>7</td></tr>
```

If the parser has column Xpaths "td[1]/text( )" (corresponding to a price field) and "td[2]/text( )" (corresponding to a quantity field), then the parsed records are:

{"Price", "Quantity"}
{"$5", "10"}
{"$10", "5"}
{"$12", "7"}

SUMMARY OF THE INVENTION

The Structuralyzer algorithm takes a document and generates a parsing scheme to parse similarly structured documents. The algorithm produces a ranked list of parsing schemes. A user selects the scheme that is closest to the intended parsing. The user may then fine tune the scheme.

DETAILED DESCRIPTION OF PREFERRED EMBODIMENTS

Figure 1:
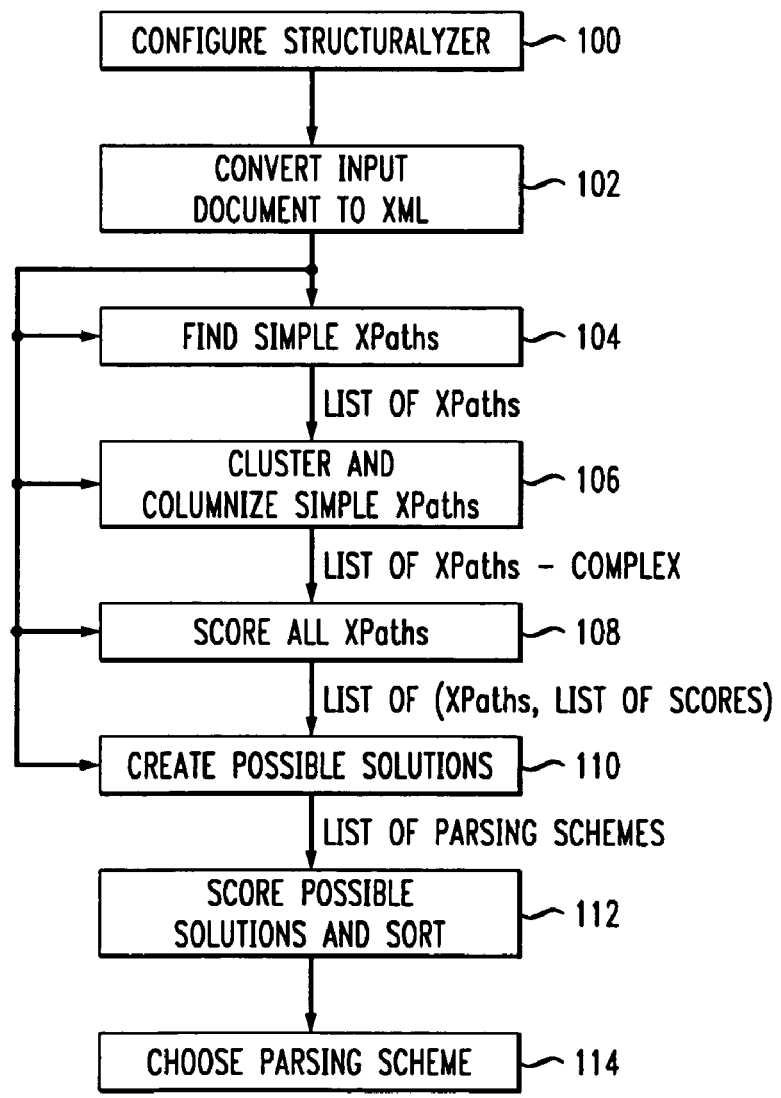
FIG. 1 is a flowchart illustrating steps in the Structuralyzer algorithm.

The Structuralyzer identifies records, which are rows and columns with repeated structure, content, or both, in the XML document. The Structuralyzer is designed for a variety of XML formats; it does not use the meaning of the XML tags, only their structure and content.

In the sample document, the Structuralyzer algorithm picks out "/html/table/tr" as the row Xpath. The column Xpaths are "tr[1]" and "tr[2]". These Xpaths produce the following 4 records: {Price, Quantity}, {$5, 10}, {$10, 5}, and {$12, 7}.

The Structuralyzer Algorithm

This section describes how to use the Structuralyzer algorithm in a sequence of seven (7) steps, as shown in FIG. 1. with an example following.

1. Configure the Structuralyzer (step 100)

The Structuralyzer algorithm has some configuration variables associated with it. These include MIN_NUMCOLUMNS, MIN_NUMRECORDS, MIN_COLSCORE, MIN_COLCOVERAGE, a list of external typers, and whether the Structuralyzer is looking for exact columns. There are default values for these variables.

"Coverage" for a given column is the fraction of records with that column present. For example, if every other record has a given column present, then the column has 50% coverage. The algorithm will eliminate possible columns with less than MIN_COLCOVERAGE coverage. Score measures the quality of a potential solution, and column score measures the quality of a column. The algorithm will eliminate columns from solutions with less than MIN_COLSCORE column score. The default value of MIN_COLSCORE is 0.1.

The algorithm will eliminate possible solutions with fewer columns than the value MIN_NUMCOLUMNS. The default value of MIN_NUMCOLUMNS is 2.

The algorithm will eliminate possible solutions with less than MIN_NUMRECORDS. The default value of MIN_NUMRECORDS is 5.

External typers will score a region of the document as a type, such as number, phone number, date, etc. Each external typer will be applied to each region. An internal algorithm for typing will be used if no external typers are supplied. The Structuralyzer runs in two modes: exact columns mode and non-exact columns mode. In exact columns mode each typer represents a single column the user is looking for in the document. This mode is appropriate when the output column names and types are predefined, such as collecting data for insertion into a database table. In non-exact columns mode the algorithm chooses the highest scoring typer or each potential column. This mode is appropriate when the user may know what types of information they are looking for, but the user has not defined specific output fields.

2. Convert the Input Document to XML (step 102)

Many document formats can be converted to XML. One example is HTML, which can be converted to XML using a program called JTidy.

3. Find All Simple Xpaths in the Document (step 104)

Scan the document to find all simple Xpaths of Element nodes and Attribute nodes. Do not create XPaths for other types of nodes.

4. Cluster and Columnize Simple Xpaths (step 106)

This step converts some of the simple Xpaths generated in Step 3 into complex Xpaths. There are two reasons for doing this. One is to create clusters of nodes with similar potential columns. The other is to create columns out of repetitive nodes, such as a series of TD elements within a TR element.

The reason for clustering Elements by substructure is to ensure that Elements with the same Xpath but different layouts and content are not grouped together. For example, there may be two different types of table rows in a table, one with a horizontal rule and one with four columns. These should be divided into two different possible record Xpaths, because they have different potential columns.

For each Xpath, either column creation or clustering occurs. The default method is to attempt column creation first and only attempt clustering if column creation fails. An alternate method is to have clustering take precedence over column creation. Another alternate method is to score both options and execute the option that scores best.

Create columns when every node of an Xpath has the same number of identically named children. If the number of children with a name varies among the elements, then columns are only created if the most common number of identically named children occurs in greater than MIN_COLCOVERAGE percent of the elements. For example, if MIN_COLCOVERAGE is 50%, there is a table with six rows, four rows contain three columns each, and the other two contain text values, then three TD columns are created, because 66% of elements contain three children named TD.

The default clustering algorithm is to partition elements of an Xpath such that all elements in each partition have the same set of child Xpaths. For each element selected by the Xpath, make a set of relative Xpaths, one for each child of the element. In cases of multiple children with the same name, use the Xpath index parameter to reference the correct child by order (i.e., td[2], td[3], . . . ). If there already exists a cluster with an identical set of child Xpaths, then the element joins that cluster. If not, create a new cluster for the element. For example, in the table row case mentioned above, this clusters TR elements containing an HR element separately from table records containing four TD elements.

There is a range of other clustering algorithms that work with the Structuralyzer algorithm. This range includes algorithms where elements with identical substructure are always clustered, and there is some metric to decide how different the substructure can be and still be contained within a cluster. For each new cluster of elements with similar substructure, an algorithm is used to generate Xpath parameters that will retrieve only elements in the cluster. Every descendent Xpath of the Xpath being clustered is divided into clusters using the same Xpath parameters. Those new descendent Xpaths that correspond to no nodes are not added.

5. Score Each Xpath as Each Type, or Use the Default Typer (step 108)

For each XPath generated from Step 106, both simple and complex, apply each typer to each node of the Xpath and average the score over all the nodes. Weight each node score by the length of the type match in the node relative to the length of the text in the node. If there is no text, then the score is zero. The weighting is to favor nodes that contain only a specific type over nodes that contain a large amount of text.

Apply a default typer algorithm when no external typers are supplied. The default typer scores XML Attributes with a score of 0.1, scores XML Elements that vary in text values over elements within an Xpath with a score of 1.0, scores elements containing unchanging text with a score of 0.5, and scores elements containing no text or only white space with zero (0.0) scores. Do not weight the score based on length, as when using external typers.

6. Create Possible Solutions (record Xpath +list of column Xpaths) (step 110)

Each possible solution is a parsing scheme. A parsing scheme consists of a record Xpath, fields, and column Xpaths. The record XPath selects a list of records in the XML document. The column Xpaths, which are relative Xpaths to the record XPath, select columns within each record. A field may have at most one typer.

Consider every Xpath as a possible record XPath. Consider all child Xpaths of a record Xpath as a column Xpath for that record XPath. Reject record Xpaths immediately if they do not have at least MIN_NUMRECORDS nodes or they refer to attribute nodes. Reject child Xpaths as columns if they do not have at least MIN_COLCOVERAGE coverage and their maximum score computed in Step 5 is not at least MIN_COLSCORE. Reject remaining possible solutions with fewer columns than MIN_NUMCOLUMNS.

7. Score Each Possible Solution and Sort Solutions by Score (step 112)

Score each possible solution and reject possible solutions with a score of zero. There are separate scoring algorithms for the exact columns and non-exact columns cases.

Score the potential solution by summing the column scores and multiplying by the log of the number of records. Score of a column is (%coverage)^2*(column score from Step 108). In exact columns mode, penalize the potential solution score by subtracting one from the score for each unmatched typer. In non-exact column mode, the column score is the highest score from Step 108, but in the exact columns case, the column score is based on an allocation of typers among columns, creating interdependence among column scores.

For exact columns mode, maximize the score of a potential solution subject to the constraint that a typer can match no more than 1 column XPath. Penalize each unmatched typer with a score of −1. Do not penalized unmatched column Xpaths. These score penalties make it likely that possible solutions that use all the supplied typers rank above those that do not.

As an example, consider the single record "<TR><TD>Weight: 1.25lbs<TD><TD>19</TD><TD> $49.99</TD><TD>555-1212</TD></TR>" and three typers: decimal, price, and phone number. The decimal typer scores high on both the first and third TD elements, but it also scores nonzero for the second and fourth TD elements, since they contain numbers. The price typer scores highest on the $49.99 element, but it scores non-zero for the other three TD elements as well, since they contain numbers. The phone number typer scores zero for the first three TD elements and scores high for the fourth. In exact columns mode, the score-maximizing allocation has the first TD matched to the decimal typer, the second TD unmatched, the third TD matched to the price typer, and the fourth TD matched to the phone number typer. Only when all three typers are considered at once is it obvious that the first TD element should be matched to the decimal typer. This example illustrates the usefulness of exact columns mode: The system can choose between competing types using information across columns instead of just assigning typers independently for each column.

For non-exact columns mode, maximize the potential solution score subject to the constraint that no two columns can overlap. Two columns overlap when either is a descendent of the other. For each column Xpath, either it or some of its descendent Xpaths may be included in the score maximizing solution, but not both. A column Xpath scores the maximum of the available typers. All columns could be the same type or they could all be of different types.

Given the same record and typers used in the exact columns example, applying the non-exact column algorithm yields a similar result. In this case, there are no overlapping columns, so that is not an issue. The first TD scores highest as a decimal. The second TD also scores highest as a decimal. The third TD scores slightly higher as a price than as a decimal, because the price has a longer match length and the column score is weighted by match length divided by total length. The fourth TD scores highest as a phone number, so that is chosen. Applying the non-exact columns algorithm yields similar results to the exact columns algorithm, but not identical. The somewhat poor-scoring second column would be suggested as a decimal, even though it is not one. This example illustrates that the non-exact column algorithm works best when used in conjunction with some user confirmation and assistance.

Pseudocode for Exact Matching:

Given: A score matrix S of all potential column Xpaths and the available typers. The solution is the score maximizing allocation of Xpaths onto typers such that no Xpath or typer is matched twice, and either can be left unmatched, but unmatched typers carry a score penalty of −1.

Pseudocode for Non-Exact Matching

Given: A score matrix S of all potential column Xpaths and the available typers. Create maximum score array MAX as the maximum of the scores for each Xpath.

Arrange the potential column Xpaths in a tree T structured the same way the XML tree is, with the each parent Xpath directly above child Xpaths. curnode=root of the tree T.

Use the following recurrence relationship to maximize the score:

score(curnode)=max(MAX[curnode], Sum(score(curnode.child))

Using this relationship, score(root of tree T) will be the maximum score for the parsing scheme.

8. Create the Resultant Parsing Scheme (step 114)

Present possible solutions to the user. If the user chooses not to be involved, then choose the highest scoring possible solution and use the chosen columns within that solution. If the user does become involved, then the user chooses the possible solution of interest and either confirms its score-maximizing column choices or chooses alternate columns.

The result of this process is a solution that contains a record Xpath with multiple column Xpaths that are children of the record Xpath. Additionally, there may be typers associated with some or all column Xpaths. This configuration is used to parse documents with similar structure to the sample document.

Applying the Structuralyzer Algorithm to a Simple Example

This section presents an example of applying the Structuralyzer algorithm to an XHTML document by following the eight (8) steps described above.

Example XHTML Document:

```
<HTML>
<HEAD>
    <TITLE>Sample Document with Table</TITLE>
</HEAD>
<BODY>
    <TABLE>
        <TR><TD colspan="4">Jumbo Packs of Pens</TD></TR>
        <TR><TD>Brand</TD><TD>Type</TD><TD>Number</TD>
        <TD>Price</TD></TR>
        <TR><TD>Bic</TD><TD>Ball-Point</TD>
        <TD>100</TD><TD>$14.99</TD></TR>
        <TR><TD>Pentel</TD><TD>Ball-Point</TD>
        <TD>250</TD><TD>$9.99</TD></TR>
        <TR><TD>Sharp</TD><TD>Ball-Point</TD>
        <TD>75</TD><TD>$7.99</TD></TR>
        <TR><TD>Pilot</TD><TD>Ball-Point</TD>
        <TD>200</TD><TD>$19.99</TD></TR>
```

-continued

```
    <TR><TD>Pilot</TD><TD>Rolling Ball</TD>
        <TD>100</TD><TD>$13.99</TD></TR>
    <TR><TD>Staedtler</TD><TD>Gel Ink</TD>
        <TD>25</TD><TD>$19.99</TD></TR>
  </TABLE>
</BODY>
</HTML>
```

1. Configure Structuralyzer

The constants are configured to a standard default configuration, MIN_NUMCOLUMNS=2, MIN_NUMRECORDS=5, MIN_COLSCORE=0.1, MIN_COLCOVERAGE=50%. No external typers will be supplied to the algorithm, so the built-in Structuralyzer column scoring will be used. The Structuralyzer algorithm will be in non-exact column mode, which is the only choice, given the lack of externally supplied typers.

2. Convert Document to XML

For this XHTML document, this conversion is not necessary.

3. Find all Simple Xpaths in the Document

The simple XPaths are:
/HTML
/HTML/HEAD
/HTML/HEAD/TITLE
/HTML/BODY
/HTML/BODY/TABLE
/HTML/BODY/TABLE/TR
/HTML/BODY/TABLE/TR/TD 4. Cluster and Columnize Xpaths Each XPath is considered for becoming columns and being clustered, and two Xpaths are changed.

Some TR elements contain one TD, whereas the others contain four TD elements, so the elements referred to by /HTML/BODY/TABLE/TR are split into two clusters, by dividing the Xpath into two Xpaths, one selecting only nodes containing a second TD, and the other selecting nodes not containing a second TD.
/HTML/BODY/TABLE/TR->2 clusters:
/HTML/BODY/TABLE/TR[not(TD[2])]
/HTML/BODY/TABLE/TR[TD[2]]

Additionally, these two changes get applied to the descendents of the original XPath, so the following conversion also occurs:
/HTML/BODY/TABLE/TR/TD->2 clusters:
/HTML/BODY/TABLE/TR[not(TD[2])]/TD
/HTML/BODY/TABLE/TR[TD[2]]/TD The XPath /HTML/BODY/TABLE/TR[TD[2]]/TD is split into four columns because there are exactly four elements of that Xpath inside every parent with Xpath /HTML/BODY/TABLE/TR[TD[2]].
/HTML/BODY/TABLE/TR[TD[2]]/TD->4 columns:
/HTML/BODY/TABLE/TR[TD[2]]/TD[1]
/HTML/BODY/TABLE/TR[TD[2]]/TD[2]
/HTML/BODY/TABLE/TR[TD[2]]/TD[3]
/HTML/BODY/TABLE/TR[TD[2]]/TD[4]

5. Score Each Xpath with Each Supplied Typer, or Use the Default Typer

The scoring is on a 0 to 1 scale. Nodes that do not change relative to their neighbor are given scores of 0.5; nodes that change relative to their neighbor are given a score of 1.0, and empty nodes are given a score of 0.0.

Scored Xpaths:
/HTML—0.5
/HTML/HEAD—0.5
/HTML/HEAD/TITLE—0.5
/HTML/BODY—0.5
/HTML/BODY/TABLE—0.5
/HTML/BODY/TABLE/TR[not(TD[2])]—0.5
/HTML/BODY/TABLE/TR[TD[2]]—1.0
/HTML/BODY/TABLE/TR[not(TD[2])]/TD—0.5
/HTML/BODY/TABLE/TR[TD[2]]/TD[1]—0.93
/HTML/BODY/TABLE/TR[TD[2]]/TD[2]—0.79
/HTML/BODY/TABLE/TR[TD[2]]/TD[3]—1.0
/HTML/BODY/TABLE/TR[TD[2]]/TD[4]—1.0

6. Create Possible Solutions

Some XPaths are immediately eliminated as record Xpaths because the number of elements they select is less than MIN_NUMRECORDS. The remaining Xpaths are:
/HTML/BODY/TABLE/TR[TD[2]]
/HTML/BODY/TABLE/TR[TD[2]]/TD[1]
/HTML/BODY/TABLE/TR[TD[2]]/TD[2]
/HTML/BODY/TABLE/TR[TD[2]]/TD[3]
/HTML/BODY/TABLE/TR[TD[2]]/TD[4].

The last four Xpaths have no descendent Xpaths, so they are eliminated because MIN_NUMCOLUMNS is 2 and they have 0 possible columns.

This leaves only the Xpath /HTML/BODY/TABLE/TR[TD[2]] as a possible record Xpath. The child Xpaths to be considered as columns are:
/HTML/BODY/TABLE/TR[TD[2]]/TD[1]
/HTML/BODY/TABLE/TR[TD[2]]/TD[2]
/HTML/BODY/TABLE/TR[TD[2]]/TD[3]
/HTML/BODY/TABLE/TR[TD[2]]/TD[4]

All of these columns have coverages that exceed MIN_COLCOVERAGE and their scores exceed MIN_COLSCORE, so they are kept.

7. Score Each Solution and Sort Them by Score

None of the columns of /HTML/BODY/TABLE/TR[TD[2]] conflict with each other, so they can all be part of the total score.

There are 7 records and the column coverages are all 100%, so the full formula for the score of this potential solution is $$\text{Score} = \log(7) * (100\%\;\hat{}\;2 * 0.93 + 100\%\;\hat{}\;2 * 0.79 + 100\%\;\hat{}\;2 * 1.0 + 100\%\;\hat{}\;2 * 1.0)$$

$$\text{Score} = 7.2$$

8. Create the Resultant Parsing Scheme.

The resultant parsing scheme is simply created by setting the record XPath to /HTML/BODY/TABLE/TR[TD[2]] and adding the four columns, /HTML/BODY/TABLE/TR[TD[2]]/TD[1], /HTML/BODY/TABLE/TR[TD[2]]/TD[2], /HTML/BODY/TABLE/TR[TD[2]]/TD[3], /HTML/BODY/TABLE/TR[TD[2]]/TD[4].

It will be apparent to those skilled in the art of computer algorithms from the foregoing detailed description of preferred embodiments that many changes and substitutions may be made without departing from the spirit and scope of the present invention, defined by the appended claims.

What is claimed is:

1. A method for making a parser for use in extracting record data from a set of XML documents with similar structure, the method comprising the steps of:
   a. identifying simple XPaths in a sample document;
   b. forming complex XPaths and clustering the complex XPaths by common substructure;
   c. scoring simple XPaths based on content in instances or differences in content among instances;
   d. scoring complex XPaths based on content in instances or differences in content among instances;

e. forming candidate parsers, with each parser comprising a single record XPath that identifies records and one or more field XPaths that identify fields;
f. scoring the candidate parsers, with each candidate parser score based on the scores of the field XPaths, a number of records identified in the sample document by the record XPath, and structural similarity between records; and
g. ordering the candidate parsers according to the scores.

2. The method of claim 1, wherein the scoring of XPaths further comprises the step of:
a. scoring XPaths based on a combination of structural similarity among XML substructures over nodes referenced by the candidate record XPath and content-based scores for the XML substructures.

3. A method of producing a parser for a set of documents with similar structure, the method comprising the steps of:
a. using a sample document from the set as input;
b. producing multiple candidate parsers based on the sample document;
c. a user choosing one or more of the candidate parsers and observing their output or outputs on the sample document; and
d. a user selecting a candidate parser of the chosen candidate parsers.

4. The method of claim 3, further comprising the step of:
a. a user altering the selected parser.

5. The method of claim 3, further comprising the step of:
a. converting the sample document to XML before producing the multiple candidate parsers.

6. The method of claim 1 further comprising the steps of:
a user choosing one or more of the candidate parsers and observing their output or outputs on the sample document; and
a user selecting a candidate parser of the chosen candidate parsers.

7. The method of claim 6 further comprising the step of:
a user altering the selected parser.

8. The method of claim 6 further comprising the step of:
converting the sample document to XML before forming the candidate parsers.

* * * * *